(No Model.) 4 Sheets—Sheet 2.

G. G. SCHROEDER.
CARBURETER.

No. 566,415. Patented Aug. 25, 1896.

WITNESSES:

INVENTOR
George G. Schroeder.
BY
Munn & Co.
ATTORNEYS.

(No Model.) 4 Sheets—Sheet 3.

G. G. SCHROEDER.
CARBURETER.

No. 566,415. Patented Aug. 25, 1896.

Witnesses
M. D. Bloudel.
Amos W. Hart.

Inventor
George G. Schroeder.

By Attorneys Munn & Co.

THE NORRIS PETERS CO., PHOTO-LITHO., WASHINGTON, D. C.

(No Model.) 4 Sheets—Sheet 4.
G. G. SCHROEDER.
CARBURETER.
No. 566,415. Patented Aug. 25, 1896.
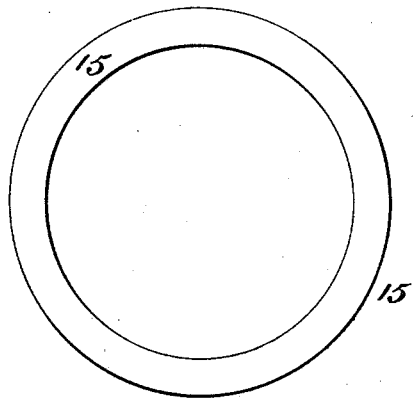
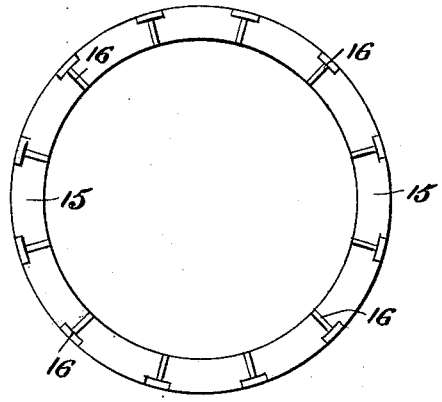
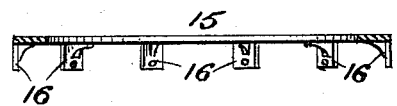
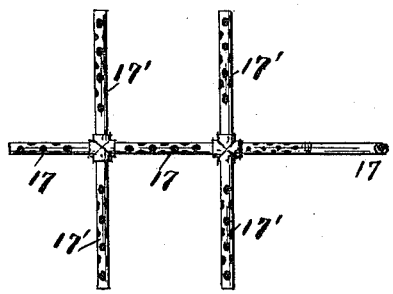
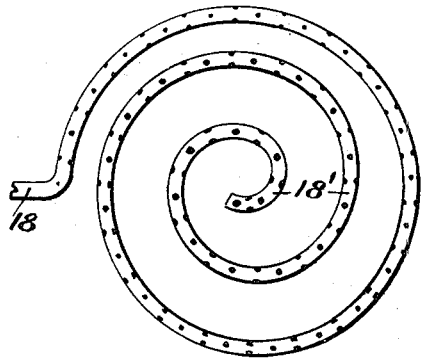
Witnesses
Inventor
George G. Schroeder.
By Attorneys

United States Patent Office.

GEORGE G. SCHROEDER, OF WASHINGTON, DISTRICT OF COLUMBIA, ASSIGNOR OF ONE-FOURTH TO HENRY P. HOLDEN, OF SAME PLACE.

CARBURETER.

SPECIFICATION forming part of Letters Patent No. 566,415, dated August 25, 1896.

Application filed January 4, 1896. Serial No. 574,373. (No model.)

*To all whom it may concern:*

Be it known that I, GEORGE G. SCHROEDER, of Washington city, in the District of Columbia, have invented a new and Improved Carbureter, of which the following is a specification.

My invention is an improvement in the class of portable gas apparatus, more particularly such as is adapted to carburet atmospheric air by means of some easily-vaporizable liquid hydrocarbon.

The body of the apparatus I have devised resembles in some features of construction the ordinary gasometers which form part of the gas plant or works of cities and large towns. Such portion of the apparatus constitutes an air-receiver and gas-holder of adjustable capacity, and my invention is mainly embodied in the attachment and adjuncts of the same, as hereinafter set forth.

I provide the lower portion of the apparatus with a layer or packing of sponge or some fibrous material capable of being charged with and temporarily holding liquid hydrocarbon. Atmospheric air is first drawn up through said material and then forced back through it, whereby it becomes fully charged or carbureted with the hydrocarbon, which is also atomized, thus producing the gas suitable for use for illumination, heating, &c.

In order to produce a superior quality of permanent gas, the layer of sponge or equivalent material is treated chemically, and the application of heat, which has been usually employed for vaporizing the hydrocarbon in this class of apparatus, is unnecessary and entirely dispensed with. I do not describe such chemical treatment herein, since it forms, properly, no part of the invention hereinafter claimed.

My improved apparatus is shown in the accompanying drawings, (four sheets,) in which—

Figure 1:
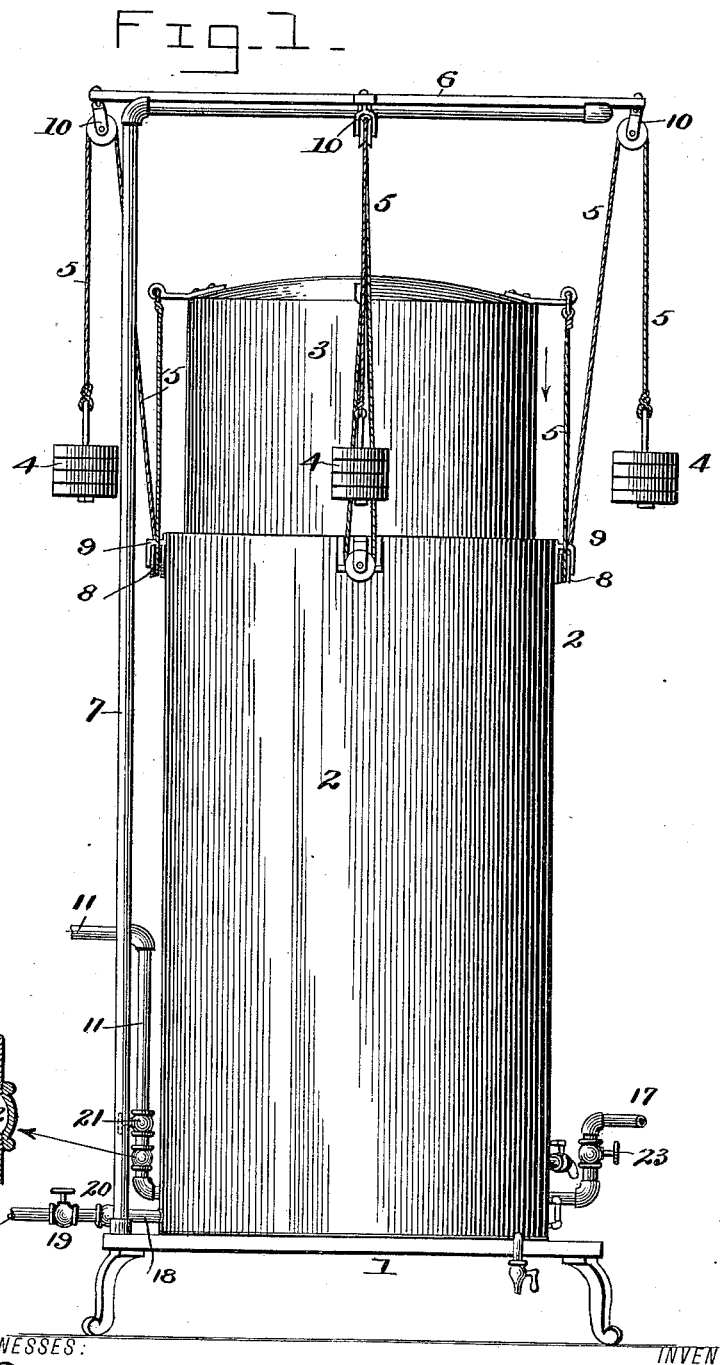
Figure 2:
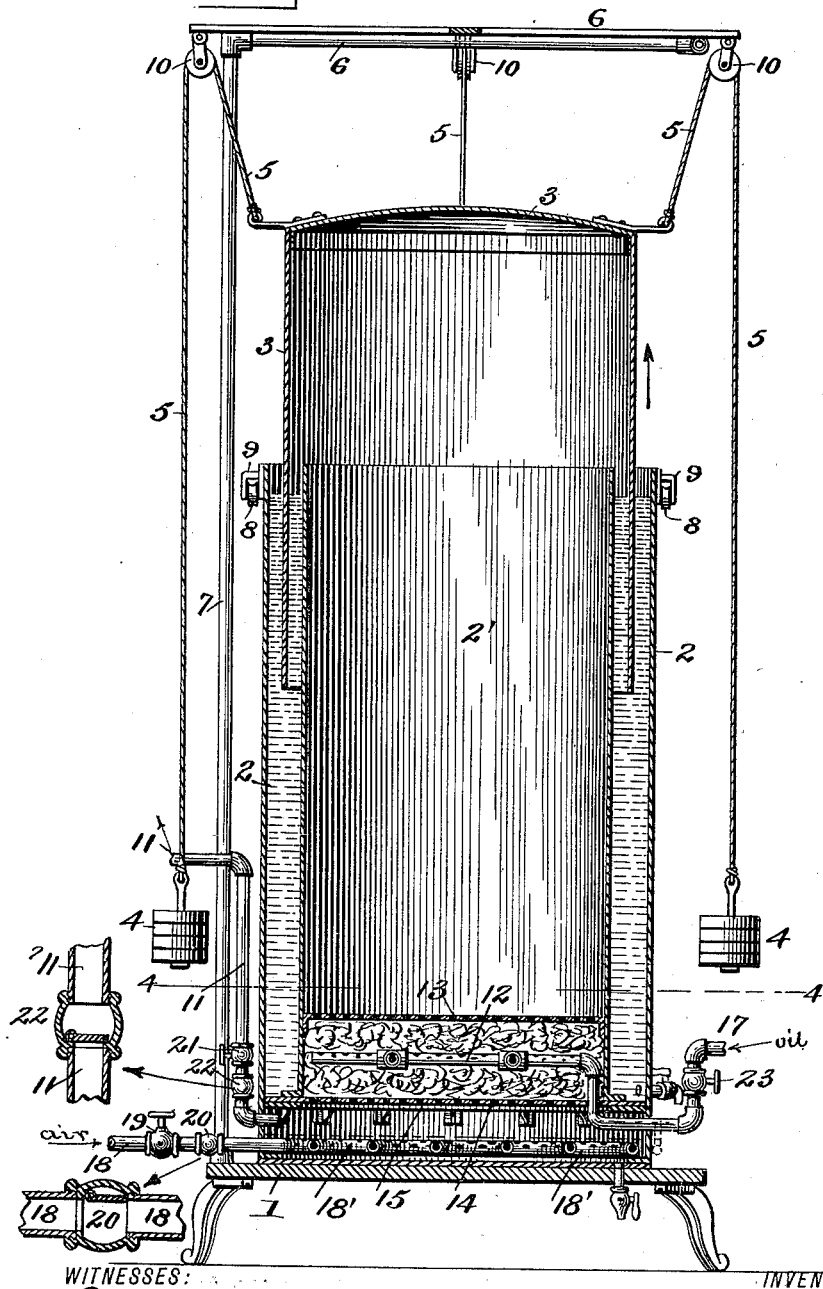
Figure 3:
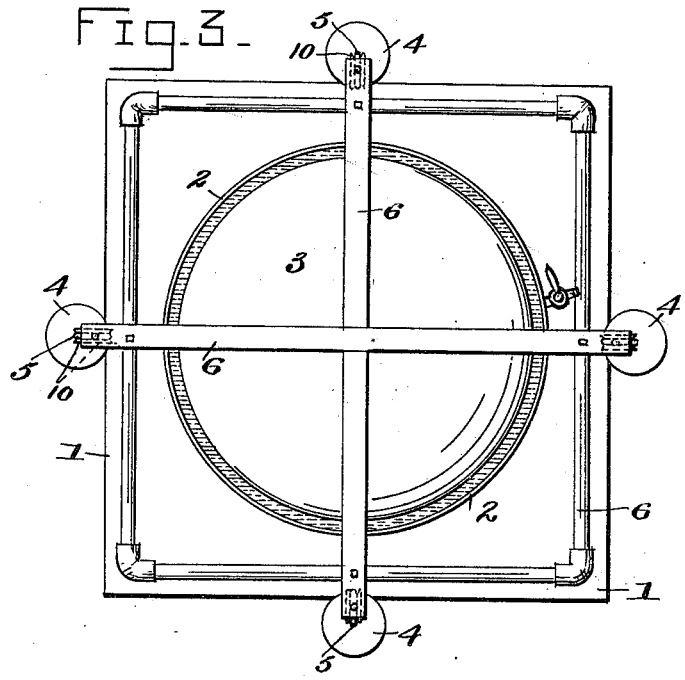
Figure 4:
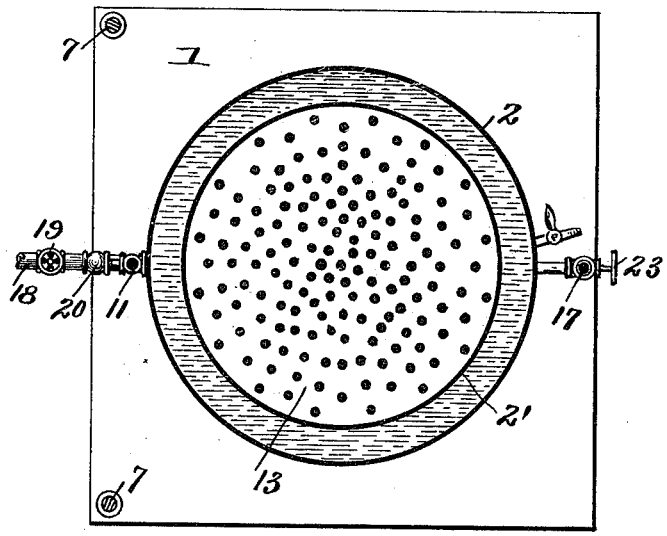

Figure 1 is a side view of my improved apparatus. Fig. 2 is a central vertical section of the same. Fig. 3 is a plan view. Fig. 4 is a horizontal section on line 4 4 of Fig. 2. Figs. 5, 6, and 7 are respectively a top plan, bottom plan, and cross-section of the ledge supporting the inner cylinder of the water-holder. Fig. 8 is a plan view of the hydrocarbon-oil-distributing pipe. Fig. 9 is a plan view of the coil of the air-inlet pipe.

The working apparatus is supported upon a suitable horizontal base 1. The body of the carbureter proper, which resembles a gasometer, consists of an annular water holder or tank 2, that is open at the top, and a cylindrical portion 3, which is open at the bottom and sealed, but movable in the annular water-holder 2, as shown.

For convenience of further description the part 3 will be termed the "gas-holder." The same is raised or forced down, as required to draw in air, Fig. 2, or expel the same when partly carbureted, by means of weights 4, suspended by cords 5 from the horizontal top portion 6 of a vertical frame 7, supported rigidly on the base 1. The said cords 5 are attached to lateral ears on the gas-holder 3, and, as shown in Fig. 1, pass down over pulleys 8, journaled in keepers or brackets 9, fixed on the outer side of the water-holder 2, and thence over pulleys 10, which are hung from the frame 6. It is apparent that by this arrangement of the cords 5 the gas-holder 3 is forced downward to apply pressure for feeding gas through the service-pipe 11 to the burners. (Not shown.) It will be noted, however, that the keepers 9 do not extend over the lower side of the pulleys proper, 8, so that the cords 5 may be easily removed from the latter, and when this is done the cords, Fig. 2, pass direct from the gas-holder 3 to the pulleys 10 on frame 6, and hence the weights 4 operate to raise the gas-holder instead of forcing it down, as shown in Fig. 1. Such arrangement (Fig. 2) of the cords 5 is necessary when air is being drawn into the receiver through the carbureting material 12, Fig. 2. The latter, consisting of a layer or packing of sponge or some fibrous material, like wool or cotton, or preferably asbestos, is held in a compartment formed in the lower portion of the water-holder 2, or, more particularly stated, in the lower end of the inner cylinder 2' of said water-holder. The said compartment is formed by a perforated diaphragm 13 and the perforated head or end 14 of such inner cylinder 2'. Said head 14 extends laterally and rests on and is soldered to the ledge 15, Figs. 2, 5, 6, and 7, attached to the side of the outer or main cylinder of the water-holder 2. Said ledge 15 is a narrow annular cast-iron plate, having supporting-brackets which are formed integrally with it and riveted to the side of the cylinder 2.

The hydrocarbon is admitted into the sponge-layer 12 by means of a pipe 17, having a series of lateral branches 17', Fig. 8, all of which are provided with graduated perforations, the same increasing in diameter with the distance from the inlet end of the pipe and its branches, so that the escape of oil is freest at the free ends of the same. Thus a uniform flow and distribution of the oil into the sponges is attained.

The air-inlet pipe 18 enters the compartment formed in the bottom of the water-holder 2 below the perforated head 14, and is arranged in a helical coil 18' on the bottom of the same, as shown in Fig. 2. The coil 18' has a series of perforations, which are also graduated in size, for the same purpose as those of the oil-supply pipe 17' before referred to. Exteriorly of the compartment the air-pipe 18 is provided with a stop-cock 19 and a check-valve 20 for preventing back flow of air. A gas-outlet pipe 11 connects with the same compartment containing the coil 18' at a point above the latter, Fig. 2. Said gas-pipe 11 is provided with a stop-cock 21 and a check-valve 22, which seats downward, for preventing back flow of gas therein. It will be seen the two check-valves 19 and 22 open and seat in opposite directions, Figs. 1 and 2.

The operation of my invention is as follows: The first step is to charge the sponge-layer 12 with the liquid hydrocarbon. This I effect by an automatic feed attachment which I have devised, or manually by opening the cock 23 of the supply-pipe 17 and admitting the requisite quantity. The next step is to open the cock 19 of the air-pipe 18 and raise the gas-holder 3 for the purpose of drawing air through the coil 18' and up through the charged sponge-layer 12. This operation is illustrated in Fig. 2, in which the cords 5 are shown detached from the pulleys 8 on the water-holder 2 and extending direct from the gas-holder to the frame-pulleys 10. The weights 4 slowly raise the gas-holder until the latter is arrested by the frame 6. Thus the air drawn through the sponge-layer 12 takes up and becomes charged with a portion of the hydrocarbon. The next step is to close the cock 19 of air-pipe 18 and open the cock 21 of gas-pipe 11, also connect the cords 5 with the pulleys 8, as shown in Fig. 1, when the action of the weights 4 is reversed, the gas-holder 3 being forced slowly downward.

It will be noted that the air is doubly charged with the hydrocarbon, since it is twice forced through the sponge-layer 12, and by this means the oil-globules are broken up, so that it is practically atomized.

Some oil may accumulate in the lower compartment of the apparatus, and it is for this reason that the coil 18' is arranged as shown, so that the air forced through it will be made to pass up through the oil when it is of such depth as to partly cover the coil.

It is to be understood that when "pulleys" are mentioned in the preceding description I do not limit myself thereto, but may use instead parts which admit of sliding instead of rolling friction for the cords 5.

Discharge-cocks are provided for the annular water-chamber and also for the oil-compartment in the base of the water-holder.

A glass gage is provided for indicating the height of the oil in such compartment.

What I claim is—

1. In a gas apparatus of the character specified, the combination with a water-holder and a vertically-movable gas-holder working therein, of system of cords, pulleys, and weights, as described the same comprising two sets of pulleys attached at fixed points exterior to or independent of the gas-holder, and the cords being connected with the latter, and removable from the lower set of pulleys, whereby a direct upward pull, or indirect downward pull may be applied to the gas-holder substantially as shown and described.

2. In a gas apparatus of the character specified, the combination with the water-holder and the gas-holder movable therein, of weighted cords attached to the latter, pulleys held on a fixed frame above the gas-holder, and passing over the pulleys and a second set of pulleys which are affixed to the water-holder, and having their lower sides free, to permit ready attachment and detachment of the cords, as required to raise or depress the gas-holder, as specified.

3. In a gas apparatus of the character specified, the combination with the water-holder, an adjustable gas-holder and means for operating it, of a fibrous layer or packing arranged in the lower part of said water-holder, an oil-supply pipe for discharging oil into the packing, perforated plates for confining the packing, and an air-inlet and gas-exit below the latter, substantially as shown and described.

4. In a gas apparatus of the character described, the combination with the water-holder, the adjustable gas-holder and means for operating it automatically, two parallel perforated plates fixed in the lower portion of the water-holder, a sponge or equivalent packing held between said plates, a perforated oil-supply pipe extending through the packing, a perforated air-inlet pipe arranged at the bottom of the compartment below the packing, and a gas-exit also below the latter, as shown and described.

5. In a gas apparatus of the character specified, the combination, with the adjustable gas-holder, the water-holder, a layer of fibrous material and perforated plates for confining it, and an oil-supply pipe located in said layer, of the perforated air-inlet pipe and gas-exit pipe arranged below such layer, and having stop-cocks and automatic check-valves which open in opposite directions, as shown and described.

GEORGE G. SCHROEDER.

Witnesses:
GEORGE B. WELCH,
RALPH C. WILTON.